United States Patent
Saito

(10) Patent No.: US 8,364,027 B2
(45) Date of Patent: Jan. 29, 2013

(54) IMAGE REPRODUCTION APPARATUS AND METHOD

(75) Inventor: Kyota Saito, Yokohama (JP)

(73) Assignee: Canon Kabushiki Kaisha (JP)

( * ) Notice: Subject to any disclaimer, the term of this patent is extended or adjusted under 35 U.S.C. 154(b) by 596 days.

(21) Appl. No.: 12/351,941

(22) Filed: Jan. 12, 2009

(65) Prior Publication Data

US 2009/0190898 A1     Jul. 30, 2009

(30) Foreign Application Priority Data

Jan. 24, 2008   (JP) ................................. 2008-014059

(51) Int. Cl.
*H04N 5/783* (2006.01)
(52) U.S. Cl. ........................................ 386/351; 386/248
(58) Field of Classification Search .................. 386/248, 386/351
See application file for complete search history.

(56) References Cited

U.S. PATENT DOCUMENTS

| 5,179,449 A | 1/1993 | Doi |
| 2007/0198111 A1* | 8/2007 | Oetzel et al. ..................... 700/94 |

FOREIGN PATENT DOCUMENTS

| JP | 2-184181 A | 7/1990 |
| JP | 10-51734 A | 2/1998 |

* cited by examiner

*Primary Examiner* — Thai Tran
*Assistant Examiner* — William Tran
(74) *Attorney, Agent, or Firm* — Rossi, Kimms & McDowell LLP

(57) ABSTRACT

A moving image reproduction apparatus making it possible to rapidly and reliably find a target frame by search with simple manipulations. It is determined whether or not a currently manipulated frame move button is the same as that manipulated at the immediately preceding manipulation. If the current and preceding manipulations are performed on the same frame move button, a moving image is moved over the same number of frames as the number of frames over which the moving image was moved at the preceding manipulation. If the current and preceding manipulation are performed on different frame move buttons, the moving image is moved over a smaller number of frames than the number of frames over which the movement occurred at the preceding manipulation.

8 Claims, 4 Drawing Sheets

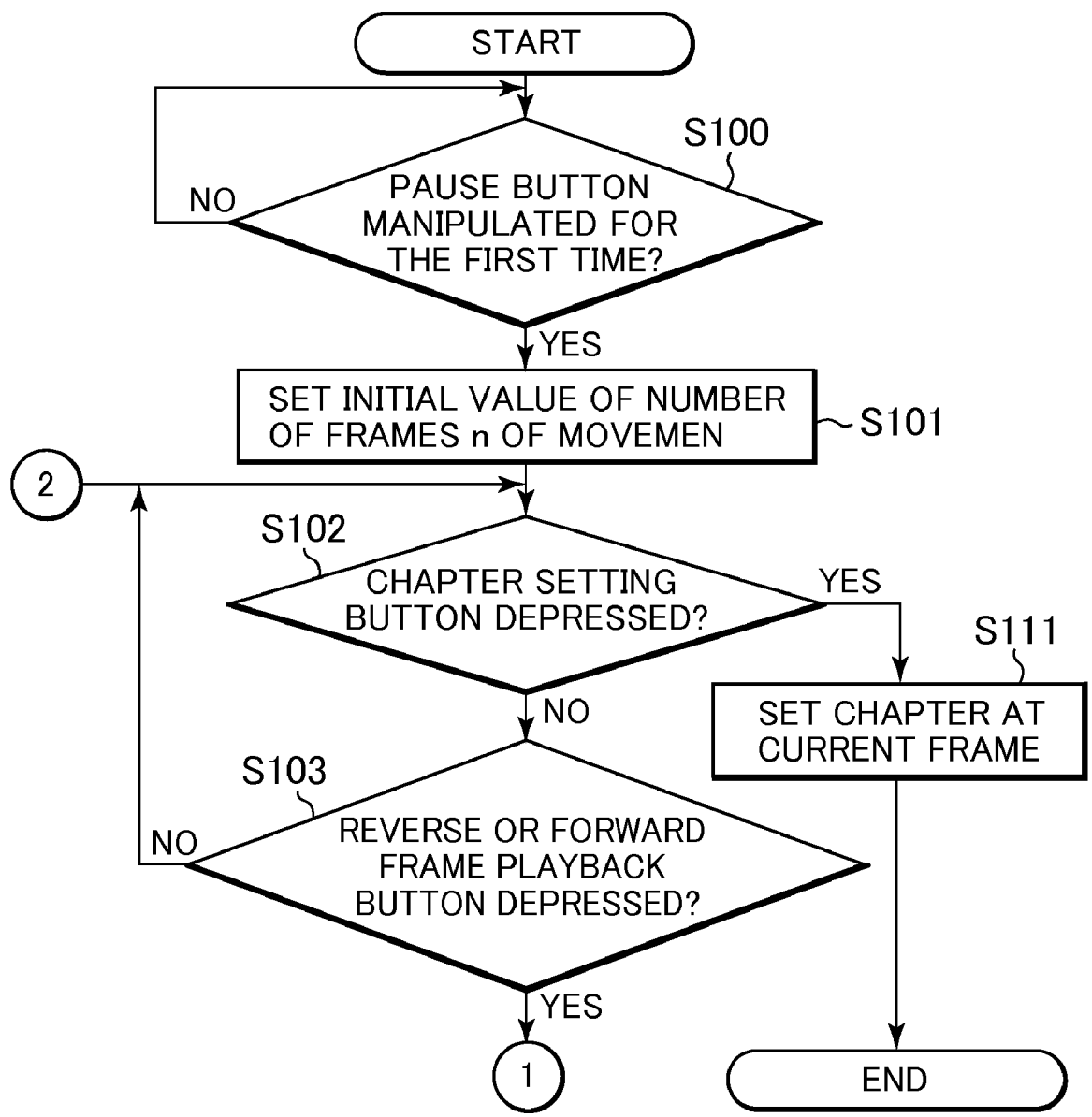

IMAGE REPRODUCTION APPARATUS AND METHOD

BACKGROUND OF THE INVENTION

1. Field of the Invention

The present invention relates to an image reproduction apparatus and an image reproduction method with which a desired frame can be found from a moving image or a desired image can be found from a plurality of images.

2. Description of the Related Art

In recent years, a randomly accessible medium such as a hard disk and an optical disk has been widely used as a moving image recording medium, and there has been increase in the use of an image recording/reproducing apparatus with a moving image editing function. Accordingly, it becomes easy for a user to edit a moving image. In the moving image editing, division of the moving image and frame search for additional chapter settings are typically carried out.

For example, in finding a target frame from a moving image including frames by search on a moving image reproduction apparatus, a user is required to carry out a fast, normal, and/or slow playback operation of the moving image so as to temporarily stop the moving image around the target frame, and then repeat forward and reverse frame playback of the moving image. With this method, if the moving image is stopped without accuracy with respect to the target frame, forward and reverse frame playback must be repeated several tens times to find the target frame, and thus a considerable time is taken. To obviate this, there is proposed a method for assisting the target frame search by analyzing luminance, sound volume, color tone, etc. in each frame and then automatically detecting a part where there is a large change in luminance, etc. (see, for example, Japanese Laid-open Patent Publication No. 2-184181).

Another method has been proposed in which a plurality of frames around the target frame are scaled down and arranged in time series, and a resultant film image is displayed for selection of the target frame (see, for example, Japanese Laid-open Patent Publication No. 10-51734).

However, the method for analyzing luminance, etc. in each frame and detecting a part where there is a large change in luminance, etc. to assist the target frame search requires a complicated algorithm for analyzing luminance, etc. in respective frames. In addition, an edit point cannot be detected if a change in luminance, etc. is small at a boundary between scenes, whereas a part of the image other than the scene boundary is detected if a large change occurs therein, as opposed to user's intention.

On the other hand, the method for displaying a film image for target frame selection requires processing to generate the film image and a screen region for displaying the same. In addition, there is a limit in a display range of the film image, and therefore, if the target frame is not within the display range, the display range must be moved or a new film image must be generated, resulting in a fear that the target frame cannot rapidly be identified.

SUMMARY OF THE INVENTION

The present invention provides an image reproduction apparatus and method capable of realizing rapid and reliable target frame search or target image search with simple manipulations.

According to a first aspect of the present invention, there is provided a moving image reproduction apparatus including a display control unit for controlling a display of a moving image on a display unit, a first manipulation unit for causing a forward-direction operation on the moving image, and a second manipulation unit for causing a reverse-direction operation on the moving image, comprising a first movement unit adapted, in response to a manipulation on the first manipulation unit, to move the moving image from a frame thereof currently displayed on the display unit to a subsequent frame thereof subsequent to the currently displayed frame by a predetermined number of frames, a second movement unit adapted, in response to a manipulation on the second manipulation unit, to move the moving image from a frame thereof currently displayed on the display unit to a preceding frame that precedes the currently displayed frame by a predetermined number of frames, a determination unit adapted to determine whether a current manipulation is performed on a same or different manipulation unit as or from the first or second manipulation unit manipulated at an immediately preceding manipulation, and a control unit adapted to control the first and second movement units such that in a case where it is determined by the determination unit that the current manipulation is performed on the same manipulation unit as that manipulated at the immediately preceding manipulation, the moving image is moved from the currently displayed frame by a same number of frames as the number of frames by which the moving image was moved at the immediately preceding manipulation, and in a case where it is determined by the determination unit that the current manipulation is performed on the different manipulation unit from that manipulated at the immediately preceding manipulation, the moving image is moved from the currently displayed frame by a less number of frames than the number of frames by which the moving image was moved at the immediately preceding manipulation.

According to a second aspect of the present invention, there is provided a moving image reproduction method for a moving image reproduction apparatus including a display control unit for controlling a display of a moving image on a display unit, a first manipulation unit for causing a forward-direction operation on the moving image, and a second manipulation unit for causing a reverse-direction operation on the moving image, the method comprising a first movement step of moving the moving image from a frame thereof currently displayed on the display unit to a subsequent frame thereof subsequent to the currently displayed frame by a predetermined number of frames in response to a manipulation on the first manipulation unit, a second movement step of moving the moving image from a frame thereof currently displayed on the display unit to a preceding frame that precedes the currently displayed frame by a predetermined number of frames in response to a manipulation on the second manipulation unit, a determination step of determining whether a current manipulation is performed on a same or different manipulation unit as or from the first or second manipulation unit manipulated at an immediately preceding manipulation, and a control step of controlling the first and second movement units such that in a case where it is determined in the determination step that the current manipulation is performed on the same manipulation unit as that manipulated at the immediately preceding manipulation, the moving image is moved from the currently displayed frame by a same number of frames as the number of frames by which the moving image was moved at the immediately preceding manipulation, and in a case where it is determined in the determination step that the current manipulation is performed on the different manipulation unit from that manipulated at the immediately preceding manipulation, the moving image is moved from the currently displayed frame by a less number of frames than the number of frames by which the moving image was moved at the immediately preceding manipulation.

With the first and second aspects of this invention, if a current manipulation is performed on the same manipulation unit as the first or second manipulation unit on which an immediately preceding manipulation was made, the moving image is moved from a frame thereof currently displayed on the display unit by the same number of frames as the number of frames by which the moving image was moved at the immediately preceding manipulation. If the manipulation is performed on the different manipulation unit from the manipulation unit manipulated at the immediately preceding manipulation, control is made to move the moving image from the currently displayed frame by a less number of frames than the number of frames by which the moving image was moved at the preceding manipulation. As a result, the target frame can rapidly and reliably be found by search with simple manipulations.

According to a third aspect of the present invention, there is provided a moving image reproduction apparatus including a display control unit for controlling a display of a moving image on a display unit, a first manipulation unit for causing a forward-direction operation on the moving image, and a second manipulation unit for causing a reverse-direction operation on the moving image, comprising a first reproduction unit adapted to forwardly playback the moving image on the display unit at a predetermined playback speed in response to a manipulation on the first manipulation unit, a second reproduction unit adapted to reversely playback the moving image on the display unit at a predetermined playback speed in response to a manipulation on the second manipulation unit, and a control unit adapted to control the first and second reproduction units such that the playback speed of the moving image is made slower at each occurrence of a manipulation changeover between the manipulation on the first manipulation unit and the manipulation on the second manipulation unit.

According to a fourth aspect of the present invention, there is provided a moving image reproduction method for a moving image reproduction apparatus including a display control unit for controlling a display of a moving image on a display unit, a first manipulation unit for causing a forward-direction operation on the moving image, and a second manipulation unit for causing a reverse-direction operation on the moving image, comprising a first reproduction step of forwardly playing back the moving image on the display unit at a predetermined playback speed in response to a manipulation on the first manipulation unit, a second reproduction step of reversely playing back the moving image on the display unit at a predetermined playback speed in response to a manipulation on the second manipulation unit, and a control step of controlling the first and second reproduction units such that the playback speed of the moving image is made slower at each occurrence of a manipulation changeover between the manipulation on the first manipulation unit and the manipulation on the second manipulation unit.

With the third and fourth aspects of this invention, the playback of a moving image is controlled such that the playback speed of the moving image is made slower at each occurrence of a changeover between the manipulation on the first manipulation unit and the manipulation on the second manipulation unit. As a result, even with a moving image reproduction apparatus which is simple in construction, the moving image can be played back in the forward/reverse direction while the playback speed is made slower around a target frame, whereby the target frame can rapidly and reliably be found by search with simple manipulations.

According to a fifth aspect of the present invention, there is provided an image reproduction apparatus including a display control unit for controlling a display of an image on a display unit, a first manipulation unit for causing a plurality of images arranged in a particular order to be reproduced sequentially in a forward direction, and a second manipulation unit for causing the plurality of images to be reproduced sequentially in a reverse direction, comprising a first movement unit adapted, in response to a manipulation on the first manipulation unit, to perform a movement from an image currently displayed on the display unit to a subsequent image subsequent to the currently displayed image by a predetermined number of images and reproduce the subsequent image, a second movement unit adapted, in response to a manipulation on the second manipulation unit, to perform a movement from an image currently displayed on the display unit to a preceding image that precedes the currently displayed image by a predetermined number of images and reproduce the preceding image, a determination unit adapted to determine whether a current manipulation is performed on a same or different manipulation unit as or from the first or second manipulation unit manipulated at an immediately preceding manipulation, and a control unit adapted to control the first and second movement units such that in a case where it is determined by the determination unit that the current manipulation is performed on the same manipulation unit as that manipulated at the immediately preceding manipulation, the movement is made from the currently displayed image by a same number of images as the number of images by which the movement was made at the immediately preceding manipulation, and in a case where it is determined by the determination unit that the current manipulation is performed on the different manipulation unit from that manipulated at the immediately preceding manipulation, the movement is made from the currently displayed image by a less number of images than the number of images by which the movement was made at the immediately preceding manipulation.

According to a sixth aspect of the present invention, there is provided an image reproduction method for an image reproduction apparatus including a display control unit for controlling a display of an image on a display unit, a first manipulation unit for causing a plurality of images arranged in a particular order to be reproduced sequentially in a forward direction, and a second manipulation unit for causing the plurality of images to be reproduced sequentially in a reverse direction, comprising a first movement step of performing a movement from an image currently displayed on the display unit to a subsequent image subsequent to currently displayed image by a predetermined number of images and reproducing the subsequent image in response to a manipulation on the first manipulation unit, a second movement step of performing a movement from an image currently displayed on the display unit to a preceding image that precedes the currently displayed image by a predetermined number of frames and reproducing the preceding image in response to a manipulation on the second manipulation unit, a determination step of determining whether a current manipulation is performed on a same or different manipulation unit as or from the first or second manipulation unit manipulated at an immediately preceding manipulation, and a control step of controlling the first and second movement units such that in a case where it is determined in the determination step that the current manipulation is performed on the same manipulation unit as that manipulated at the immediately preceding manipulation, the movement is made from the currently displayed image by a same number of images as the number of images by which the movement was made at the immediately preceding manipulation, and in a case where it is determined in the determination step that the current manipulation is performed on the different manipulation unit from that manipulated at the immediately preceding manipulation, the movement is made from the currently displayed image by a less number of images than the number of images by which the movement was made at the immediately preceding manipulation.

With the fifth and sixth aspects of this invention, if a current manipulation is performed on the same manipulation unit as the first or second manipulation unit on which an immediately preceding manipulation was performed, a movement is made from an image currently displayed on the display unit by the same number of images as the number of frames by which the movement was made at the immediately preceding manipulation. If the manipulation is performed on the different manipulation unit from the unit manipulated at the preceding manipulation, the movement is made by a less number of image than the number of frames by which the movement was made at the preceding manipulation. As a result, a target image can rapidly and reliably be found by search from the plurality of images with simple manipulations.

Further features of the present invention will become apparent from the following description of exemplary embodiments with reference to the attached drawings.

BRIEF DESCRIPTION OF THE DRAWINGS

FIGS. 3A and 3B are a flowchart showing a target frame search process implemented by the moving image reproduction apparatus;

DETAILED DESCRIPTION OF THE PREFERRED EMBODIMENTS

The present invention will now be described in detail below with reference to the drawings showing preferred embodiments thereof.

First Embodiment

In a first embodiment, a moving image reproduction apparatus is described, in which forward and reverse frame jumps are performed in response to user's manipulations, thereby assisting the user to immediately find a target frame from a continuous moving image.

Figure 1:
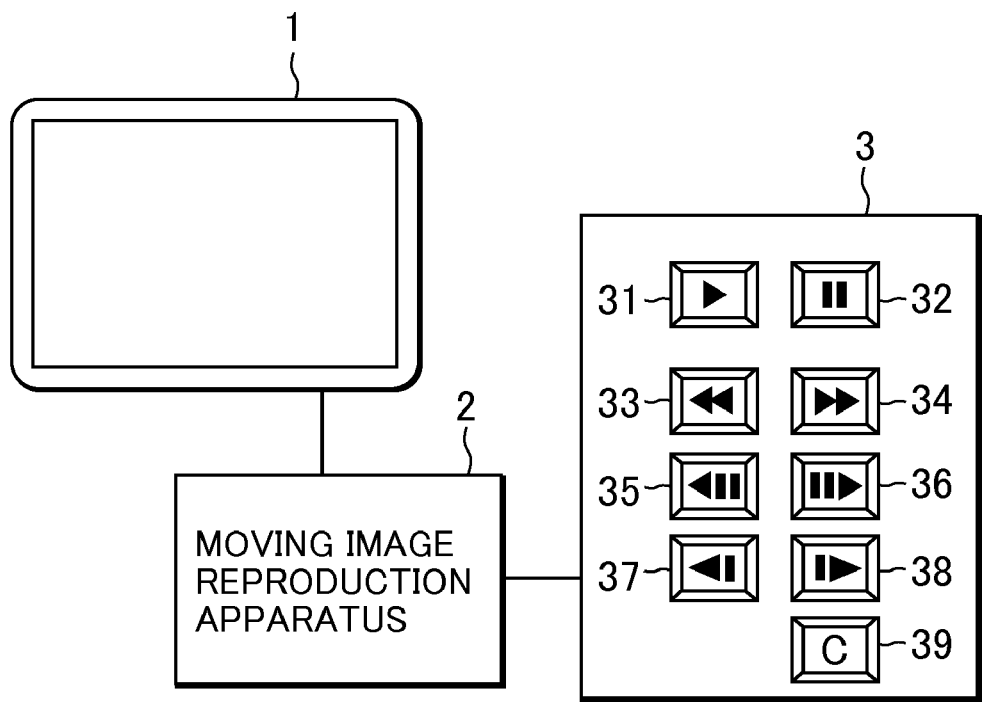
FIG. 1 is a block diagram showing the schematic construction of a moving image reproduction apparatus according to a first embodiment of this invention.

FIG. 1 shows in block diagram the schematic construction of the moving image reproduction apparatus of the first embodiment.

As shown in FIG. 1, the moving image reproduction apparatus 2 is connected to a television monitor 1 functioning as a display unit for displaying a moving image and a still image, and is connected to an operation panel 3 adapted for being manipulated by the user for editing operations. Although these structural elements of the illustrated example are physically separated from one another, they may be configured integrally or partly integrally with one another. For example, the operation panel 3 may be hard keys provided in a body of the moving image reproduction apparatus 2, or may function as a remote controller. Alternatively, the operation panel 3 may be software keys displayed on the television monitor 1.

On the operation panel 3 there are disposed a plurality of operating buttons including a play button 31 which is a functional button for playing back a moving image at a predetermined playback speed. When the play button 31 is depressed, a playback instruction is supplied from the operation panel 3 to the moving image reproduction apparatus 2. In response to this, a moving image is transmitted from the reproduction apparatus 2 to the monitor 1, and the moving image is displayed on the monitor 1. A pause button 32 is a functional button for temporarily stopping the playback of the moving image. A still image (one of frames of the moving image being played back) is displayed on the monitor 1.

A fast reverse playback button 33 is a functional button for reversely playing back the moving image at a high speed (second manipulation unit). A fast forward playback button 34 is a functional button for forwardly playing back the moving image at a high speed (first manipulation unit). A reverse frame playback button 35 is a functional button for reversely moving the moving image by a predetermined number of frames (second manipulation unit). A forward frame playback button 36 is a functional button for forwardly moving the moving image by a predetermined number of frames (first manipulation unit). Hereinafter, the reverse and forward frame playback buttons 35, 36 will each be referred to as the frame move button.

A slow reverse playback button 37 is a functional button for reversely playing back at a low speed the moving image being played back, and a slow forward playback button 38 is a functional button for forwardly playing back at a low speed the moving image being played back. A chapter setting button 39 is a functional button for additional chapter settings.

Figure 2:
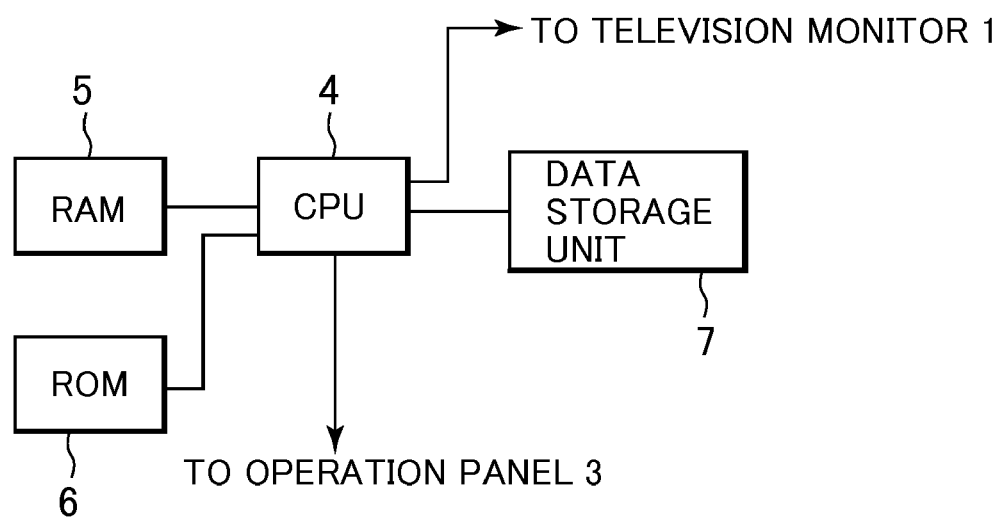
FIG. 2 is a block diagram showing the schematic internal construction of the moving image reproduction apparatus in FIG. 1.

FIG. 2 shows in block diagram the schematic internal construction of the moving image reproduction apparatus 2. In FIG. 2, structural elements relating to this invention are shown, with other structural elements omitted.

A CPU 4 uses a RAM 5 (random access memory) as a work area, and executes a program stored in a ROM 6 (read only memory). A data storage unit 7 connected to the CPU 4 is comprised of a flash memory, an optical disk, a magnetic disk, a magnet-optical disk, or the like, and is adapted to record and store moving image data before and after being edited.

The user is able to edit the moving image displayed on the television monitor 1 by manipulating the operation panel 3, while watching the moving image displayed on the monitor 1. In response to an input from the operation panel 3 and in accordance with the program stored in the ROM 6, the CPU 4 edits the moving image data stored in the data storage unit 7 and stores the edited moving image data into the storage unit 7.

Figure 3B:
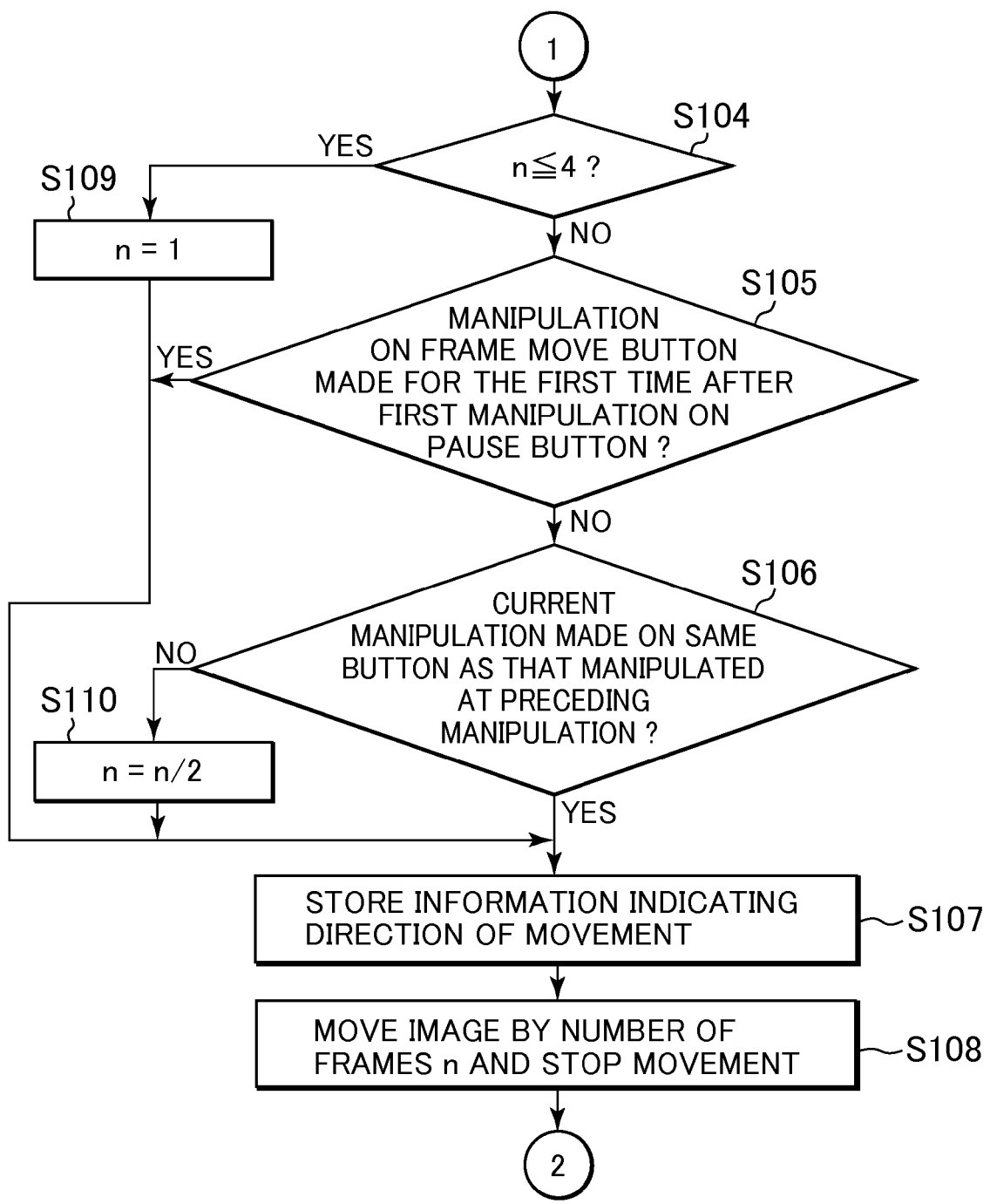
Figure 4:
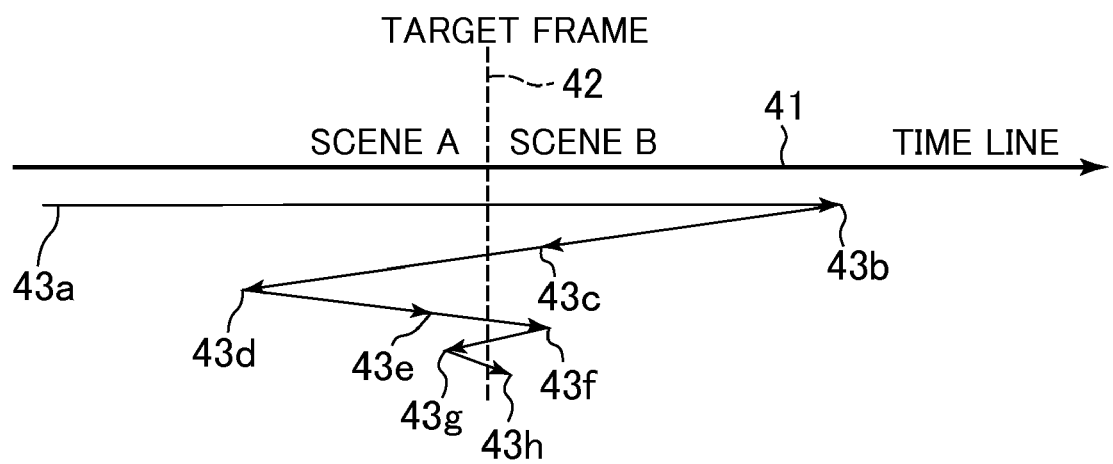
FIG. 4 is a conceptual view showing how a target frame is found by the search process in FIGS. 3A and 3B.

Next, with reference to FIGS. 3A, 3B and 4, a description is given of a process to find a frame at which a scene A is changed over to a scene B in a moving image played back by the moving image reproduction apparatus 2.

FIGS. 3A and 3B show in flowchart a target frame search process implemented by the moving image reproduction apparatus 2. The search process is realized by the CPU 4 by executing the program stored in the ROM 6. FIG. 4 shows the concept of how the target frame is found by the search process.

In this embodiment, it is assumed that the moving image is obtained by recording a television broadcasting program, and includes the scene A which is a commercial scene and the scene B which is a main-part video, and a chapter is additionally set to the top frame of the scene B.

In FIG. 4, reference numeral 41 denotes a so-called time line, and reference numeral 42 denotes the target frame which the user wishes to finally display on the monitor 1 is, e.g., the top frame of the scene B. A frame 43a is a starting frame for the operation of additional chapter settings. The user operates the reproduction apparatus 2 for high-speed reproduction, equimultiple speed reproduction, or slow-speed reproduction of the moving image, and depresses the pause button 32 when determining that the scene A is changed over to the scene B, while watching the moving image displayed on the monitor 1. Since there is a delay in human response, pausing takes place at a frame 43b lag behind the target frame 42 by several frames or several seconds depending on the playback speed of the moving image.

Referring to FIGS. 3A and 3B, when the pause button 32 is depressed, the CPU 4 determines whether or not the pause button 32 is manipulated for the first time (step S100). If it is determined that the pause button 32 is manipulated for the first time, the CPU 4 sets an initial value of the number of frames $\underline{n}$ by which the moving image is to be moved upon manipulation of the frame move button (step S101). In this embodiment, the initial value of the number of frames $\underline{n}$ of movement is set to a value of 32, for example.

Next, the CPU 4 determines whether or not the chapter setting button 39 is depressed (step S102). If the button 39 is depressed, a chapter is additionally set at the current frame (step S111), and the present process is completed. On the other hand, if the chapter setting button 39 is not depressed (No to step S102), the CPU 4 determines whether or not the frame move button, i.e., the reverse or forward frame playback button 35 or 36, is depressed (step S103). If either the reverse or forward frame playback button 35 or 36 is depressed (YES to step S103), the CPU 4 determines whether or not the initial value of the number of frames $\underline{n}$ of movement set in step S101 is equal to or less than a predetermined number of frames (step S104). In this embodiment, the predetermined number of frames is set to a value of 4. If the number of frames $\underline{n}$ of movement has been stored into the RAM 5 at step S108 described below, the CPU 4 determines whether or not the number of frames $\underline{n}$ of movement stored in the RAM 5 is equal to or less than the predetermined number of frames (number-of-frames determination unit).

If it is determined in step S104 that the number of frames $\underline{n}$ of movement set in step S101 (or stored in the RAM 5 in step S108) is equal to or less than a value of 4, the flow proceeds to step S109. On the other hand, if the number of frames $\underline{n}$ of movement exceeds a value of 4, the flow proceeds to step S105. If for example that the number of frames $\underline{n}$ of movement is equal to the initial value thereof, i.e., equal to a value of 32, the flow proceeds to step S105.

In step S105, the CPU 4 determines whether or not the manipulation on the frame move button determined in step S103 is made for the first time after the first manipulation on the pause button 32 determined in step S100. If it is determined that the manipulation is made on the frame move button for the first time after the first manipulation on the pause button (YES to step S105), the flow proceeds to step S107. Otherwise, the flow proceeds to step S106.

In step S107, the CPU 4 stores into the RAM 5 information indicating the direction (reverse or forward) of movement to be caused by the user's manipulation on the frame move button (the reverse or forward frame playback button 35 or 36). Then, the CPU 4 moves the moving image (causes a jump) by the number of frames $\underline{n}$ in the direction represented by the information stored in the RAM 5, stops the movement, and stores into the RAM 5 the number of frames $\underline{n}$ over which the moving image has been moved (step S108). The phrase "jump by the number of frames $\underline{n}$" indicates that the frame at the destination of the jump is displayed on the monitor 1, with intervening frames skipped and not displayed. The jump is performed, e.g., from the frame 43b to the frame 43c in FIG. 4. As a result of the jump from the frame 43b to the frame 43c, intervening frames are not visible to the user, but the target frame can be reached fast.

As shown in FIG. 4, the frame displayed on the monitor 1 just after the jump from the frame 43b to the frame 43c still belongs to the scene B, and therefore the reverse frame playback button 35 is depressed again (YES to step S103) to move the moving image in the same direction as the jump direction. In that case, the number of frames $\underline{n}$ of movement is equal to the initial value thereof, i.e., equal to a value of 32 (No to step S104), and it is again determined whether or not the manipulation is performed on the frame move button for the first time after the first manipulation on the pause button 32 (step S105). Since the manipulation on the frame move button is not performed for the first time after the first manipulation on the pause button 32, the flow proceeds to step S106 in FIG. 3B.

In step S106, the CPU 4 compares the image movement direction caused by the preceding manipulation on the frame move button and represented by the information stored in the RAM 5 with the movement direction caused by the user's current manipulation on the frame move button, thereby determining whether the current manipulation is made on the same or different button as or from that manipulated at the preceding manipulation. If it is determined at step S106 that the manipulation is performed on the same button as that manipulated at the preceding manipulation, the CPU 4 again stores into the RAM 5 information indicating the direction of movement to be caused by the user's manipulation on the frame move button (step S107). Then, the CPU 4 causes a jump by the number of frames $\underline{n}$ in the movement direction represented by the information stored in the RAM 5, stops the movement, and stores into the RAM 5 the number of frames $\underline{n}$ over which the movement occurred (step S108). The phrase "jump by the number of frames $\underline{n}$" indicates the movement, e.g., from the frame 43c to the frame 43d in FIG. 4.

Specifically, since a frame belonging to the scene A is displayed on the monitor 1, it is understood that the target frame is within the range from the frame 43c to the frame 43d over which the movement occurred by the last manipulation. At the frame 43d, the image is excessively reversed. This indicates that the next jump should be made in the direction opposite to the previous jump direction. Thus, the forward frame playback button 36 is manipulated, and in response to this, the processing in step S104 and the subsequent steps are carried out.

If it is determined at step S106 that the current manipulation is performed on the button different from that manipulated at the preceding manipulation (NO to step S106), the CPU 4 changes the number of frames $\underline{n}$ of movement to a value which is specific times as large as and smaller than a previous value. In a case for example that the previous value of the number of frames $\underline{n}$ of movement is equal to 32, the number of frames $\underline{n}$ of movement is changed to a value of 16, which is half the previous value (n=n/2).

Next, the CPU 4 again stores into the RAM 5 information indicating the direction of movement to be caused by the user's manipulation on the frame move button (step S107). Then, the CPU 4 causes a jump by the number of frames $\underline{n}$ of movement in the direction represented by the information stored in the RAM 5, stops the movement, and stores into the RAM 5 the number of frames $\underline{n}$ over which the movement occurred (step S108). The phrase "jump by the number of frames n" indicates the movement, e.g., from the frame 43$d$ to the frame 43$e$ in FIG. 4.

Specifically, since a frame belonging to the scene A is displayed on the monitor 1, the forward frame playback button 36 is depressed to cause the movement in the same direction as the jump direction, and temporarily stops the movement at a frame position (frame 43$f$) forwardly moved by the number of frames n (=16) from the frame position before the jump. Since both the frame 43$f$ and the frame 43$c$ are at the same frame position and a frame belonging to the scene B is displayed on the monitor 1, it is understood that the target frame 42 is within the range over which the movement occurred by the last manipulation, i.e., between the frames 43$e$ and 43$f$. As described above, the range in which there is the target frame 42 is made narrower while performing frame jumps in the forward and reverse directions. When the target frame 42 is finally reached and the target frame is displayed on the monitor 1, the user depresses the chapter setting button 39 whereby a chapter can additionally be set at the target frame 42.

If it is determined in step S104 that the number of frames n of movement set in step S101 (or stored in the RAM 5 in step S108) is equal to or less than the predetermined number of frames, e.g., 4, the flow proceeds to step S109.

In step S109, since a jump over several frames is no longer useful, the CPU 4 changes the number of frames n of movement (jump) to a value of 1 (n=1), and then proceeds to step S108 in which an operation for forwardly or reversely moving the moving image by one frame is carried out and then the movement is temporarily stopped. It should be noted that the number of frames n of movement is set to a value of 1 (n=1) in this example, but this is not limitative. The number of frames n of movement may be a fixed value equal to or less than the predetermined number of frames (a value of 4 in this example).

According to the first embodiment, it is determined whether or not a frame move button manipulated at current manipulation is the same as that manipulated at the immediately preceding manipulation. If it is determined that the current and preceding manipulations are carried out on the same frame move button, the moving image is moved over the same number of frames as that over which the movement occurred at the preceding manipulation. On the other hand, if it is determined that the current and preceding manipulation are performed on different frame move buttons, the moving image is moved over a smaller number of frames than that over which the movement occurred at the preceding manipulation. As a result, the target frame can rapidly and reliably be found by search with simple manipulations.

Second Embodiment

In a second embodiment, a description is given of a moving image reproduction apparatus for assisting a user to find a target frame from a moving image by changing the playback speed of the moving image around the target frame in accordance with user's operations. The moving image reproduction apparatus of the second embodiment is the same in construction as that of the first embodiment. Like parts as those of the first embodiment are denoted by like numerals, and a description thereof will be omitted. In the following, only parts different from those of the first embodiment will be described.

Figure 5:
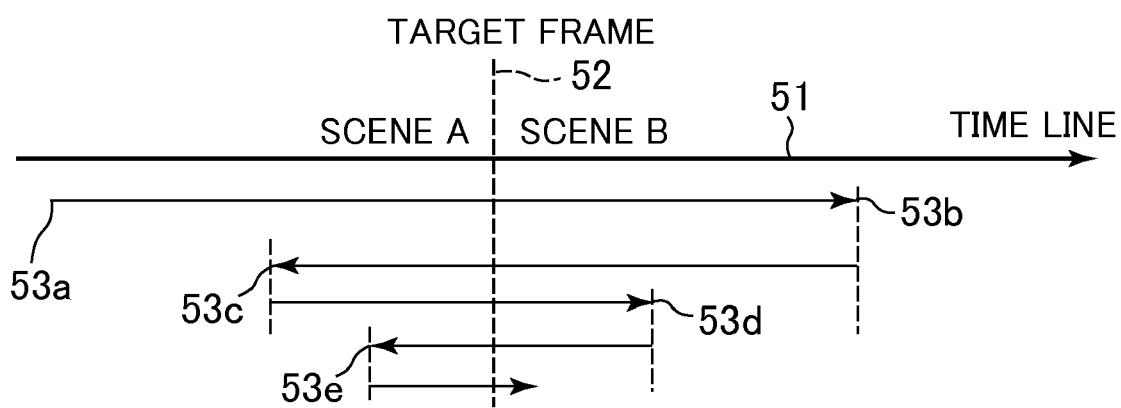
FIG. 5 is a conceptual view showing a target frame search method performed by a moving image reproduction apparatus according to a second embodiment of this invention.

FIG. 5 shows in conceptual view how target frame search is carried out by the moving image reproduction apparatus 2 according to the second embodiment of this invention.

It is assumed in this embodiment that the moving image is obtained by recording a television broadcasting program and includes a scene A which is a commercial scene and a scene B which is a main-part video, and a chapter is additionally set to the top frame of the scene B.

In FIG. 5, reference numeral 51 denotes a so-called time line, and reference numeral 52 denotes a target frame which the user wishes to finally display on the monitor 1, and which is the top frame of the scene B, for example. A frame 53$a$ is a starting frame for operation of additional chapter settings. The user first depresses the fast forward playback button 34 for performing fast forward playback (for example, 30× forward playback), releases the button 34 when determining that the scene A is changed over to the scene B on the screen while watching the image displayed on the monitor 1, and depresses the fast reverse playback button 33. Since there is a delay in human response, reverse playback at a slower reproduction speed (for example, 10× reverse playback) than the previous reproduction speed is started at a frame 53$b$ lag behind the target frame 52 by several frames or several seconds depending on the reproduction seed of the moving image (second reproduction unit).

Subsequently, when determining that the scene B is changed over to the scene A on the screen while watching the image displayed on the monitor 1, the user releases the fast reverse playback button 33 and depresses the fast forward playback button 34. Since there is a delay in human response again at that time, forward playback at a further slower reproduction speed (for example, double-speed playback) than the previous one is started at a frame 53$c$ lag behind the target frame 52 by several frames or several seconds depending on the reproduction speed of the moving image (first reproduction unit).

As described above, at each occurrence of changeover from the manipulation on the fast forward playback button 34 to the manipulation on the fast reverse playback button 33 or from the manipulation on the button 33 to the manipulation on the button 34, the reproduction speed is gradually decreased to a reproduction speed slower than the equimultiple speed. In a state that it becomes easy to find the target frame 52, i.e., for example when the fast forward playback button 34 or the fast reverse playback button 33 is depressed after the reproduction speed is made equal to ¼× speed, the operation is controlled such that the forward or reverse movement is made one frame by one frame.

With the second embodiment, high-speed reproduction is repeated in different directions of reproduction (fast playback/rewind), and therefore it becomes easy to find the target frame. Since the high-speed reproduction is performed, there is a possibility that time required to find the target frame becomes longer than in the moving image reproduction method of the first embodiment. However, since frames between direction-changing points where the reproduction direction is changed are visible, it is easy to find that the target frame is in between the direction-changing points, whereby a reliable manipulation is ensured. Thus, using a moving image reproduction apparatus which is simple in construction, the target frame can rapidly and reliably be found by search from the moving image by reproducing the moving image around the target frame at a reduced reproduction speed.

It should be noted that this invention is applicable not only to the jump reproduction of a moving image, but also to the jump reproduction of still images. In that case, there may be used an image reproduction apparatus including a display unit for displaying an image, a playback button for causing a plurality of images arranged in a particular order to be sequentially reproduced in a forward direction (to make a shift from a currently displayed image to a subsequent image that is subsequent to the currently displayed image by a predetermined number of images), and a reverse button for causing the plurality of images to be sequentially reproduced in a reverse direction (to make a shift from a currently displayed image to a preceding image that precedes the currently displayed image by a predetermined number of images).

As the particular order in which images are arranged, there may be mentioned photography date/time order, file name order, and file number order, which are based on attribute information on image files. As the playback button and the reverse button, right and left direction buttons may be used in a jump reproduction mode (these buttons can be used as image playback buttons in a normal mode).

In the following, a description is given with reference to FIGS. 3A and 3B. If it is determined at step S103 that the left or right direction button is depressed in the jump reproduction mode, the CPU 4 determines whether or not a variable n (in this case, the number of images of movement) is equal to or less than an initial value of the variable, e.g., a value of 100 (step S104).

Subsequently, if it is determined at step S106 that a current manipulation is performed on the same button as that manipulated at the immediately preceding manipulation, the CPU 4 causes the movement by the same number of images as the number of images over which the movement occurred at the immediately preceding manipulation (step S108). On the other hand, if it is determine that the current manipulation is performed on the different button from that manipulated at the immediately preceding manipulation, the CPU 4 causes the movement by a smaller number of images than the number of images over which the movement occurred at the immediately preceding manipulation. In the case of the jump reproduction mode where the still image jump is performed by, e.g., 100 images, the number of images of movement, n, is changed from 100 (forward direction) to 50 (reverse direction), and to 25 (forward direction), and so on. When the number of images of movement, n, is equal to or less than a predetermined number of images, the movement is performed one image by one image.

With above described arrangement, the target still image can rapidly and reliably be found by search from a plurality of images by utilizing the jump reproduction mode, etc. of the image reproduction apparatus.

It is to be understood that the present invention may also be accomplished by supplying a system or an apparatus with a storage medium in which a program code of software, which realizes the functions of the above described embodiments is stored and by causing a computer (or CPU or MPU) of the system or apparatus to read out and execute the program code stored in the storage medium. In that case, the program code itself read from the storage medium realizes the functions of the above described embodiments, and therefore the program code and the storage medium in which the program code is stored constitute the present invention.

Examples of the storage medium for supplying the program code include a floppy (registered trademark) disk, a hard disk, and a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. The program code may be downloaded via a network.

Further, it is to be understood that the functions of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-014059, filed Jan. 24, 2008, which is hereby incorporated by reference herein in its entirety.

What is claimed is:

1. A moving image reproduction method for a moving image reproduction apparatus including a display control unit adapted to control a display of a moving image on a display unit, a first manipulation unit adapted to cause a forward-direction operation on the moving image, and a second manipulation unit adapted to cause a reverse-direction operation on the moving image, said method comprising:

a first movement step of moving the moving image from a frame thereof currently displayed on the display unit to a subsequent frame thereof subsequent to the currently displayed frame by a predetermined number of frames in response to a manipulation on the first manipulation unit;

a second movement step of moving the moving image from a frame thereof currently displayed on the display unit to a preceding frame that precedes the currently displayed frame by a predetermined number of frames in response to a manipulation on the second manipulation unit;

a determination step of determining whether a current manipulation is performed on a same or different manipulation unit as or from the first or second manipulation unit manipulated at an immediately preceding manipulation;

a first control step of controlling the first and second movement steps such that in a case where it is determined in said determination step that the current manipulation is performed on the same manipulation unit as that manipulated at the immediately preceding manipulation, the moving image is moved from the currently displayed frame by a same number of frames as the number of frames by which the moving image was moved at the immediately preceding manipulation, and in a case where it is determined in said determination step that the current manipulation is performed on the different manipulation unit from that manipulated at the immediately preceding manipulation, the moving image is moved from the currently displayed frame by a less number of frames than the number of frames by which the moving image was moved at the immediately preceding manipulation;

a number-of-frames determination step of determining the number of frames by which the moving image was moved at the immediately preceding manipulation; and a second control step of controlling the first and second movement steps such that the moving image is moved by a fixed number of frames N in response to the current manipulation and each of a plurality of subsequent manipulations in response to the number-of-frames determination step determining that the number of frames by which the moving image was moved at the immediately preceding manipulation is equal to or less than a predetermined number of frames M, the control of the second control step having priority over the control of the first control step, wherein N is less than M.

2. An image reproduction apparatus comprising:

a display control unit adapted to control a display of an image on a display unit;

a first manipulation unit adapted to cause a plurality of images arranged in a particular order to be reproduced sequentially in a forward direction;

a second manipulation unit adapted to cause the plurality of images to be reproduced sequentially in a reverse direction;

a first movement unit adapted, in response to a manipulation on the first manipulation unit, to perform a movement from an image currently displayed on the display unit to a subsequent image subsequent to the currently displayed image by a predetermined number of images and reproduce the subsequent image;

a second movement unit adapted, in response to a manipulation on the second manipulation unit, to perform a movement from an image currently displayed on the display unit to a preceding image that precedes the currently displayed image by a predetermined number of images and reproduce the preceding image;

a determination unit adapted to determine whether a current manipulation is performed on a same or different manipulation unit as or from the first or second manipulation unit manipulated at an immediately preceding manipulation;

a first control unit adapted to control the first and second movement units such that in a case where it is determined by said determination unit that the current manipulation is performed on the same manipulation unit as that manipulated at the immediately preceding manipulation, the movement is made from the currently displayed image by a same number of images as the number of images by which the movement was made at the immediately preceding manipulation, and in a case where it is determined by said determination unit that the current manipulation is performed on the different manipulation unit from that manipulated at the immediately preceding manipulation, the movement is made from the currently displayed image by a smaller number of images than the number of images by which the movement was made at the immediately preceding manipulation;

a number-of-frames determination unit adapted to determine the number of images by which the movement was made at the immediately preceding manipulation; and a second control unit adapted to control the first and second movement units such that the movement is made by a fixed number of images N in response to the current manipulation and each of a plurality of subsequent manipulations in response to the number-of-frames determination unit determining that the number of images by which the movement was made at the immediately preceding manipulation is equal to or less than a predetermined number of images M, the control of the second control unit having priority over the control of the first control unit, wherein N is less than M.

3. An image reproduction method for an image reproduction apparatus including a display control unit adapted to control a display of an image on a display unit, a first manipulation unit adapted to cause a plurality of images arranged in a particular order to be reproduced sequentially in a forward direction, and a second manipulation unit adapted to cause the plurality of images to be reproduced sequentially in a reverse direction, the method comprising:

a first movement step of performing a movement from an image currently displayed on the display unit to a subsequent image subsequent to currently displayed image by a predetermined number of images and reproducing the subsequent image in response to a manipulation on the first manipulation unit;

a second movement step of performing a movement from an image currently displayed on the display unit to a preceding image that precedes the currently displayed image by a predetermined number of frames and reproducing the preceding image in response to a manipulation on the second manipulation unit;

a determination step of determining whether a current manipulation is performed on a same or different manipulation unit as or from the first or second manipulation unit manipulated at an immediately preceding manipulation;

a first control step of controlling the first and second movement steps such that in a case where it is determined in said determination step that the current manipulation is performed on the same manipulation unit as that manipulated at the immediately preceding manipulation, the movement is made from the currently displayed image by a same number of images as the number of images by which the movement was made at the immediately preceding manipulation, and in a case where it is determined in said determination step that the current manipulation is performed on the different manipulation unit from that manipulated at the immediately preceding manipulation, the movement is made from the currently displayed image by a smaller number of images than the number of images by which the movement was made at the immediately preceding manipulation;

a number-of-frames determination step of determining the number of images by which the movement was made at the immediately preceding manipulation; and a second control step of controlling the first and second movement units such that the movement is made by a fixed number of images N in response to the current manipulation and each of a plurality of subsequent manipulations in response to the number-of-frames determination step determining that the number of images by which the movement was made at the immediately preceding manipulation is equal to or less than a predetermined number of images M, the control of the second control step having priority over the control of the first control step, and wherein N is less than M.

4. A moving image reproduction apparatus comprising:

a display control unit adapted to control a display of a moving image on a display unit;

a first manipulation unit adapted to cause a forward-direction operation on the moving image;

a second manipulation unit adapted to cause a reverse-direction operation on the moving image;

a first movement unit adapted, in response to a manipulation on the first manipulation unit, to move the moving image from a frame thereof currently displayed on the display unit to a subsequent frame thereof subsequent to the currently displayed frame by a predetermined number of frames;

a second movement unit adapted, in response to a manipulation on the second manipulation unit, to move the moving image from a frame thereof currently displayed on the display unit to a preceding frame that precedes the currently displayed frame by a predetermined number of frames;

a determination unit adapted to determine whether a current manipulation is performed on a same or different manipulation unit as or from the first or second manipulation unit manipulated at an immediately preceding manipulation;

a first control unit adapted to control the first and second movement units such that in a case where it is determined by said determination unit that the current manipulation is performed on the same manipulation unit as that manipulated at the immediately preceding manipulation, the moving image is moved from the currently displayed frame by a same number of frames as the number of frames by which the moving image was moved at the immediately preceding manipulation, and in a case where it is determined by said determination unit that the current manipulation is performed on the different manipulation unit from that manipulated at the immediately preceding manipulation, the moving image is moved from the currently displayed frame by a less number of frames than the number of frames by which the moving image was moved at the immediately preceding manipulation;

a number-of-frames determination unit adapted to determine the number of frames by which the moving image was moved at the immediately preceding manipulation; and a second control unit adapted to control the first and second movement units such that the moving image is moved by a fixed number of frames N in response to the current manipulation and each of a plurality of subsequent manipulations in response to the number-of-frames determination unit determining that the number of frames by which the moving image was moved at the immediately preceding manipulation is equal to or less than a predetermined number of frames M, the control of the second control unit having priority over the control of the first control unit, wherein N is less than M.

5. The moving image reproduction apparatus according to claim 4, wherein the number of frames N is 1.

6. The moving image reproduction apparatus according to claim 4, wherein in a case where it is determined by said determination unit that the current manipulation is performed on the different manipulation unit from that manipulated at the immediately preceding manipulation, said first control unit is adapted to control the first and second movement units such that the moving image is moved from the currently displayed frame by a number of frames that is a fraction of the number of frames by which the moving image was moved at the immediately preceding manipulation.

7. The moving image reproduction apparatus according to claim 6, wherein the fraction is one-half.

8. The moving image reproduction apparatus according to claim 4, further including:

a storage control unit adapted to control storage of information representing on which of the first and second manipulation units a last manipulation was performed, wherein said determination unit is adapted to determine whether the current manipulation is performed on the same or different manipulation unit as or from that manipulated at the immediately preceding manipulation by comparing the manipulation currently performed on the first or second manipulation unit with the last manipulation represented by the information stored under the control of said storage control unit.

* * * * *